(12) United States Patent
Satou et al.

(10) Patent No.: US 10,012,424 B2
(45) Date of Patent: Jul. 3, 2018

(54) REFRIGERATION APPARATUS

(75) Inventors: Kiichirou Satou, Sakai (JP); Hisaaki Takaoka, Sakai (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 955 days.

(21) Appl. No.: 14/124,888

(22) PCT Filed: Jun. 6, 2012

(86) PCT No.: PCT/JP2012/003703
§ 371 (c)(1),
(2), (4) Date: Dec. 9, 2013

(87) PCT Pub. No.: WO2012/169182
PCT Pub. Date: Dec. 13, 2012

(65) Prior Publication Data
US 2014/0096553 A1  Apr. 10, 2014

(30) Foreign Application Priority Data

Jun. 10, 2011  (JP) .................................. 2011-130139

(51) Int. Cl.
*F25B 49/00*  (2006.01)
*F25D 17/04*  (2006.01)
*F25B 49/02*  (2006.01)

(52) U.S. Cl.
CPC .......... *F25B 49/022* (2013.01); *F25D 17/042* (2013.01); *F25B 2600/01* (2013.01);
(Continued)

(58) Field of Classification Search
CPC .... F25B 49/022; F25B 2700/02; F25B 49/00; F25D 17/042; F25D 2317/04111; F25D 2700/12; F25D 17/04
See application file for complete search history.

(56) References Cited

U.S. PATENT DOCUMENTS

2003/0145614 A1  8/2003  Tanaka
2007/0074528 A1  4/2007  Rodriguez et al.
(Continued)

FOREIGN PATENT DOCUMENTS

EP  1912029 A1  4/2008
EP  2105688 A2  9/2009
(Continued)

OTHER PUBLICATIONS

Satoru et al., Refrigerator for Refrigerated Container, Mar. 5, 1999, JPH1163769A, Whole Document.*
(Continued)

*Primary Examiner* — Larry Furdge
(74) *Attorney, Agent, or Firm* — Birch, Stewart, Kolasch & Birch, LLP

(57) ABSTRACT

The refrigeration apparatus includes a controller. The controller performs normal operation control for controlling drive of the exterior fan and the compressor in order to bring the interior temperature to a target temperature, dehumidification control in which the interior humidity is adjusted to a predetermined target range of the high-humidity region, and power-saving control which is implemented by the control of drive of the exterior fan and the compressor such that a change in the interior temperature is kept within a temperature range based on the target temperature. The controller switches from the dehumidification control to the power-saving control in the case where the interior humidity has become a lower limit value of the target range of the high-humidity region or less.

4 Claims, 7 Drawing Sheets

(52) U.S. Cl.
CPC . *F25B 2600/0251* (2013.01); *F25B 2600/112* (2013.01); *F25B 2700/02* (2013.01); *F25D 2317/04111* (2013.01); *F25D 2700/12* (2013.01); *Y02B 30/743* (2013.01)

(56) References Cited

U.S. PATENT DOCUMENTS

| | | | | |
|---|---|---|---|---|
| 2009/0025410 A1* | 1/2009 | Tanaka | ............... | F25B 41/043 62/228.1 |
| 2009/0165484 A1* | 7/2009 | Matsui | ............... | F24F 3/1411 62/271 |
| 2011/0041539 A1* | 2/2011 | Nylykke | ............... | F25D 17/042 62/276 |

FOREIGN PATENT DOCUMENTS

| | | | |
|---|---|---|---|
| JP | 59-62480 A | | 4/1984 |
| JP | 64-63973 A | | 3/1989 |
| JP | H03274346 A | * | 12/1991 |
| JP | H1163769 A | * | 3/1999 |
| JP | 2002-327964 A | | 11/2002 |
| JP | 2003232551 A | * | 8/2003 |
| JP | 2006112700 A | * | 4/2006 |
| JP | 2006-153341 A | | 6/2006 |
| JP | 2006-349302 A | | 12/2006 |
| JP | 3864989 B1 | | 1/2007 |
| WO | 2010/055681 A1 | | 5/2010 |
| WO | 2011/019607 A2 | | 2/2011 |

OTHER PUBLICATIONS

Eiji, Air Conditioner Controlling Method, Aug. 22, 2003, JP2003232551A, Whole Document.*
Jitsuo et al., Air Conditioner, Dec. 5, 1991, JPH03274346A, Whole Document.*
Maekawa, Dehumidifying Operation Control Method of Air Conditioner, Apr. 27, 2006, JP2006112700A, Whole Document.*
International Search Report for PCT/JP2012/003703 dated Sep. 11, 2012.

* cited by examiner

FIG. 3

REFRIGERATION APPARATUS

TECHNICAL FIELD

The present invention relates to a refrigeration apparatus including a cooling heat exchanger for cooling interior air, and particularly relates to a power-saving operation of the refrigeration apparatus.

BACKGROUND ART

Conventionally, a refrigeration apparatus that cools interior air of a refrigerator unit or freezer unit has been known. For example, Patent Document 1 discloses a refrigeration apparatus that cools interior air of a container used in marine transport or the like. The refrigeration apparatus includes a refrigerant circuit to which a compressor, a condenser, an expansion valve, and a cooling heat exchanger (evaporator) are connected. The refrigeration apparatus circulates a refrigerant in the refrigerant circuit to perform a vapor-compression refrigeration cycle. As a result, the refrigerant flowing in the cooling heat exchanger absorbs heat from interior air and evaporates to cool the interior air.

In the refrigeration apparatus described above, temperature control with high precision is required such that interior air is, for example, approximately ±0.5° C. with respect to a target temperature in accordance with a cargo or the like within the container. Therefore, in the refrigeration apparatus described above, the compressor is operated, always giving priority to ensuring precision of the temperature control. However, once interior air is cooled within the container, cooling load does not change drastically. Also, it is unlikely that the external temperature that gives influence on the cooling load changes drastically. Thus, as disclosed in Patent Document 2, for example, a refrigeration apparatus provided with a power-saving operation mode in which a compressor is operated intermittently has been proposed.

In the refrigeration apparatuses shown in the Patent Documents 1 and 2, a dehumidification operation in which the humidity of interior air is adjusted is often performed when the humidity of interior air that is a cooling target needs to be held within a certain range. However, in the case of performing the dehumidification operation, it is necessary to perform a continuous operation of a compressor in the refrigeration apparatus in order to ensure the operation performance for both dehumidification and cooling. Thus, power consumption of the refrigeration apparatus increases. Therefore, although provided with the power-saving operation mode, the refrigeration apparatus is not sufficient in power efficiency. Thus, further improvement in power efficiency has been desired.

Patent Document 1: Japanese Patent Application Laid-open No. 2002-327964

Patent Document 2: Japanese Patent No. 3864989

SUMMARY OF THE INVENTION

An object of the present invention is to enable operation with greater power efficiency than conventionally achieved while ensuring the operating performance for both dehumidification and cooling in a refrigeration apparatus that cools interior air with a cooling heat exchanger.

A refrigeration apparatus according to one aspect of the present invention includes a cooling heat exchanger (14) for cooling an interior, a fan mechanism (16) that generates a flow of air for cooling the cooling heat exchanger (14), and a compressor (11) that compresses a refrigerant. The refrigeration apparatus includes a refrigerant circuit (10) to which the cooling heat exchanger (14) and the compressor (11) are connected and which is for performing a refrigeration cycle with the refrigerant that is circulated, a humidity detection unit (HS) that detects a humidity of interior air, and a temperature detection unit (RS) that detects a temperature of interior air. The refrigeration apparatus includes a control unit (50) that performs normal operation control for controlling drive of the fan mechanism (16) and the compressor (11) in order to bring an interior temperature detected by the temperature detection unit (RS) to a target temperature, dehumidification control for adjusting a humidity detected by the humidity detection unit (HS) to a predetermined target range of the high-humidity region, and power-saving control which is implemented by the control of drive of the fan mechanism (16) and the compressor (11) such that a change in the interior temperature within a temperature range is tolerated, the temperature range being based on the target temperature. In the refrigeration apparatus, the control unit (50) switches from the dehumidification control to the power-saving control in a case where a humidity detected by the humidity detection unit (HS) has become a lower limit value of the target range of the high-humidity region or less at a time of the dehumidification control.

BRIEF DESCRIPTION OF THE DRAWINGS

FIG. 3 is a schematic configuration diagram of a refrigerant circuit included in a refrigeration apparatus according to one embodiment of the present invention.

DESCRIPTION OF EMBODIMENTS

Figure 1:
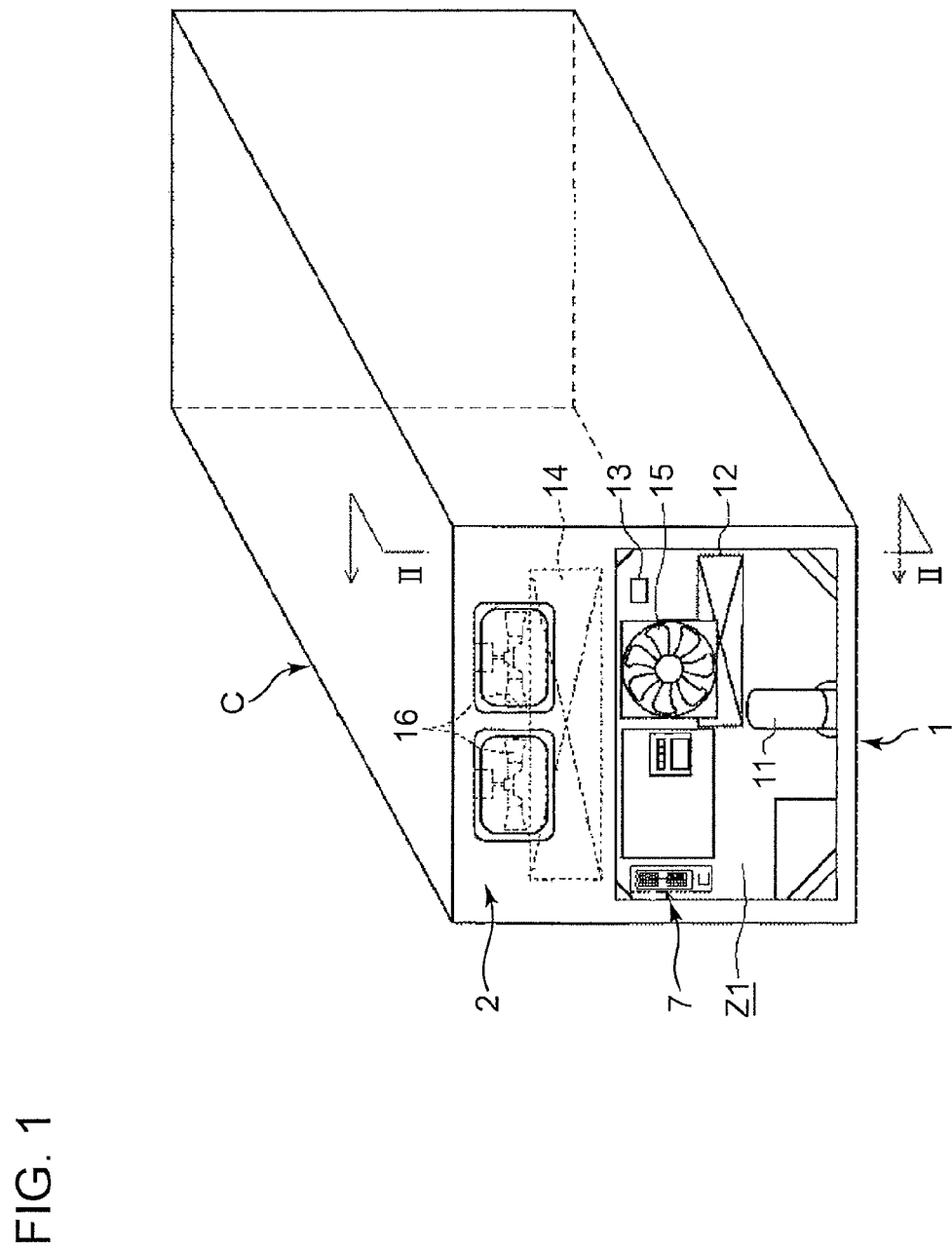
FIG. 1 is a perspective view showing a refrigeration container.
Figure 2:
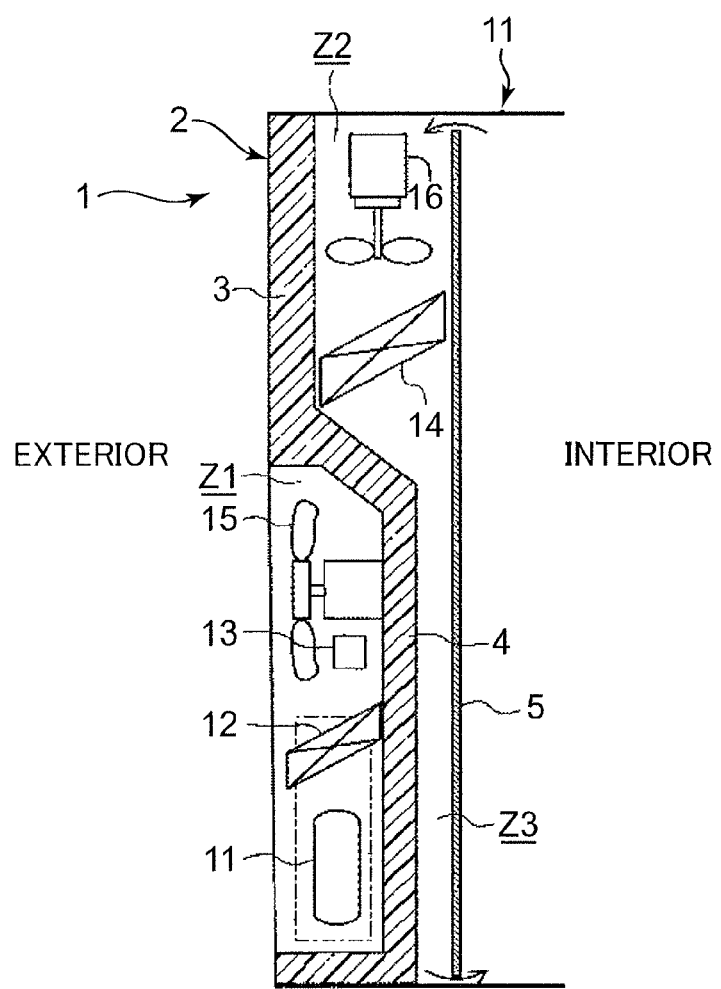
FIG. 2 is a sectional view along line II-II in FIG. 1.
Figure 3:
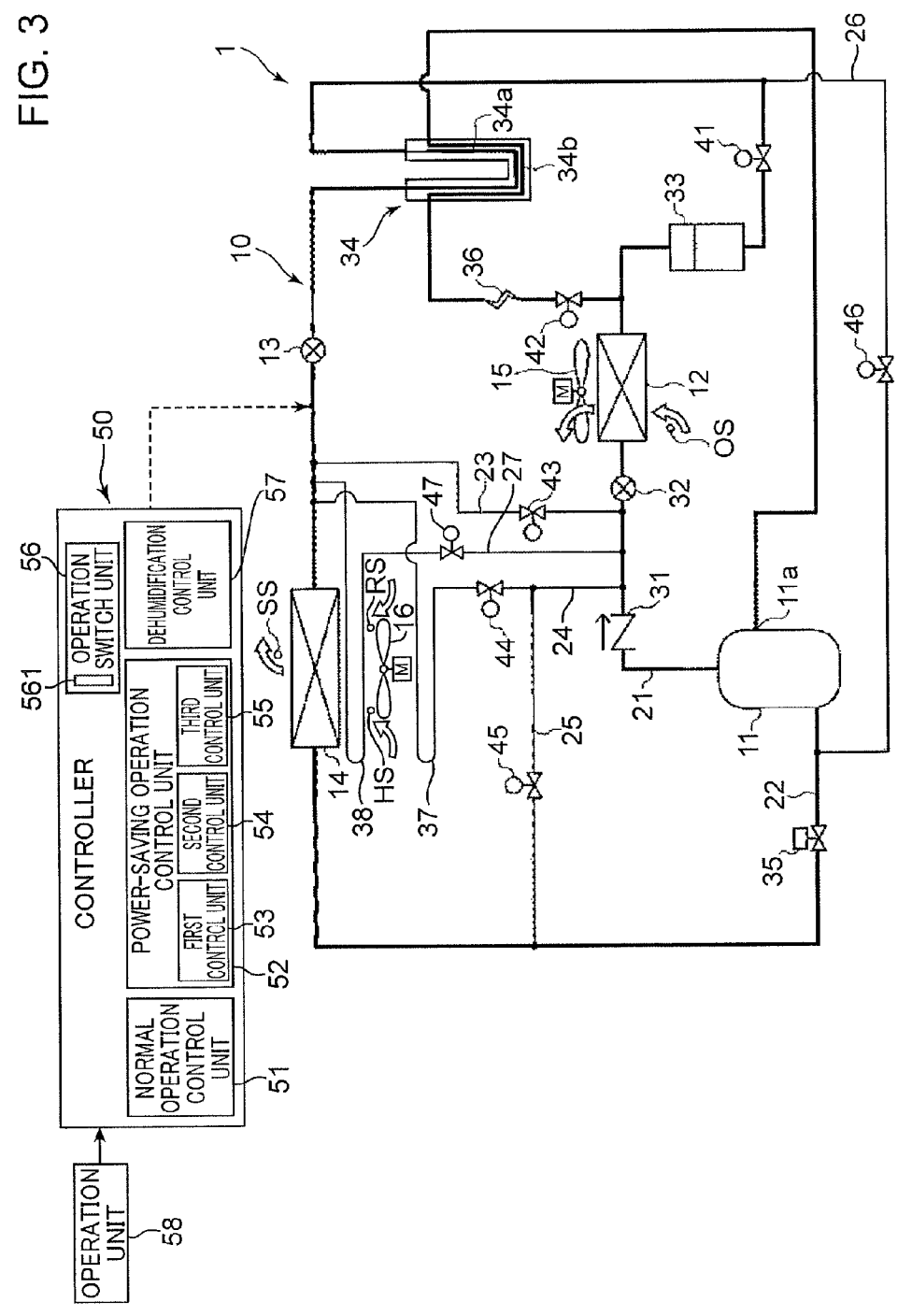

A refrigeration apparatus according to an embodiment of the present invention will be described below in detail based on the drawings. FIG. 1 is a perspective view showing a refrigeration container. FIG. 2 is a sectional view along line II-II in FIG. 1. FIG. 3 is a schematic configuration diagram of a refrigerant circuit included in the refrigeration apparatus according to one embodiment of the present invention.

As shown in FIG. 1 and FIG. 2, a refrigeration apparatus 1 is provided to a container C used in land transport, marine transport, or the like. The refrigeration apparatus 1 of this embodiment is for cooling (refrigerating or freezing) an interior (cargo room) of the container C. The refrigeration apparatus 1 is attached to cover a front opening portion of the container C formed as a rectangular box.

The refrigeration apparatus 1 includes a main body wall 2, a partition wall 5, a refrigerant circuit 10, an exterior fan 15, an interior fan 16, and a controller 50.

The main body wall 2 is formed of a heat insulation material or the like and is adhered and fixed to the front opening portion of the container C to cover the opening. In the main body wall 2, approximately an upper half portion is a flat portion 3, and a lower half portion is a dent-shape portion 4 that is dented to the inside (interior side) relative to the flat portion 3. The partition wall 5 is provided parallel to the main body wall 2 and on the inside (interior side) relative to the main body wall 2.

The dent-shape portion 4 of the main body wall 2 forms an outside space Z1 on the outside (exterior side). Between the flat portion 3 of the main body wall 2 and the partition wall 5, an inside upper portion space Z2 is formed. Between the dent-shape portion 4 of the main body wall 2 and the partition wall 5, an inside lower portion space Z3 is formed. An upper portion of the inside upper portion space Z2 and a lower portion of the inside lower portion space Z3 are communicated with the interior (cargo room).

In the outside space Z1, the exterior fan 15 described above, a compressor 11 and a condenser 12 described later, and the like are arranged. In the inside upper portion space Z2, the interior fan 16 described above and an evaporator 14 described later are arranged.

In the refrigerant circuit 10, as shown in FIG. 3, the compressor 11, the condenser 12, an expansion valve 13, and the evaporator 14 are connected as main components.

The compressor 11 compresses the refrigerant that has been drawn in and discharges the compressed refrigerant. In this example, the compressor 11 is configured of a scroll compressor of a fixed capacity type in which the rotation speed of a compressor motor is constant.

The condenser 12 is configured of a so-called air-cooled condenser. In the vicinity of the condenser 12, the exterior fan 15 is provided. The exterior fan 15 sends exterior air (outside air) to the condenser 12. With the condenser 12, heat exchange is performed between outside air sent by the exterior fan 15 and the refrigerant. In the vicinity of the condenser 12, an exterior temperature sensor OS is provided. The exterior temperature sensor OS detects the temperature of exterior air (i.e., exterior temperature) flowing toward the condenser 12.

The expansion valve 13 is configured of an electronic expansion valve of which the opening degree is adjustable. The expansion valve 13 is adjusted in the opening degree in accordance with the degree of superheat of the refrigerant flowing out of the evaporator 14.

The evaporator 14 forms a cooling heat exchanger for cooling interior air.

In the vicinity of the evaporator 14, the interior fan 16 is provided. The interior fan 16 is one example of a fan mechanism. When the interior fan 16 is driven, interior air is drawn in from an intake opening to flow through the evaporator 14, and then air that has flown through the evaporator 14 is blown out again to the interior from an outlet opening. In the evaporator 14, heat exchange is performed between interior air that flows due to the interior fan 16 being driven and the refrigerant that passes through the inside of the evaporator 14. Note that the intake opening and the outlet opening for interior air are respectively gaps on the upper side and the lower side of the partition wall 5 in FIG. 2. The refrigeration apparatus 1 in this embodiment is described as a refrigeration apparatus of a so-called bottom blowing type, for example.

In the vicinity of the evaporator 14, two temperature sensors are provided. Specifically, in the vicinity of the evaporator 14 on the intake opening side, an intake temperature sensor RS (one example of a temperature detection unit) is provided. In the vicinity of the evaporator 14 on the outlet opening side, an outlet temperature sensor SS is provided. The intake temperature sensor RS detects the temperature of interior air sent to the evaporator 14. The outlet temperature sensor SS detects the temperature of interior air that is blown out to the interior after passing through the evaporator 14.

Further, in the vicinity of the evaporator 14 on the intake opening side, a humidity sensor HS (one example of a humidity detection unit) is provided. The humidity sensor HS detects the humidity of interior air sent to the evaporator 14.

A discharge pipe 21 of the compressor 11 is connected to an inflow end of the condenser 12 via a check valve 31 and a discharge pressure regulating valve 32 in that order. An outflow end of the condenser 12 is connected to the expansion valve 13 via a receiver 33, a first solenoid valve 41, and a high-pressure side flow path 34a of an economizer heat exchanger 34 in that order. An intake pipe 22 of the compressor 11 is connected to an outflow end of the evaporator 14 via an intake proportional valve 35. An inflow end of the evaporator 14 is connected to the expansion valve 13.

The economizer heat exchanger 34 causes the refrigerant flowing in the high-pressure side flow path 34a and the refrigerant flowing in a low-pressure side flow path 34b to exchange heat. An inflow end of the low-pressure side flow path 34b is connected to a pipe between the condenser 12 and the receiver 33 via a caterpillar tube 36 and a second solenoid valve 42 in that order. An outflow end of the low-pressure side flow path 34b is connected to an intermediate intake opening 11a of the compressor 11. The intermediate intake opening 11a is opened to a route along the compression of the refrigerant in a compression mechanism of the compressor 11.

The intake proportional valve 35 adjusts the intake refrigerant amount of the compressor 11. That is, the intake proportional valve 35 forms a flow amount regulating valve that adjusts the refrigerant circulation amount in the refrigerant circuit 10. When the refrigerant circulation amount is adjusted by the intake proportional valve 35, the cooling performance of the evaporator 14 is adjusted. The opening degree of the intake proportional valve 35 is adjusted in accordance with the detected temperature of the intake temperature sensor RS. The intake temperature sensor RS is an interior temperature sensor that detects the temperature of interior air (interior temperature).

In the refrigerant circuit 10, a first defrost pipe 23, a second defrost pipe 24, a discharge gas bypass pipe 25, a pipe 27, and a liquid injection pipe 26 are connected.

The first defrost pipe 23 and the second defrost pipe 24 are pipes for a defrost operation for guiding the refrigerant discharged by the compressor 11 to the evaporator 14 and melting frost attached to the evaporator 14. The first defrost pipe 23 and the second defrost pipe 24 are connected to a pipe between the check valve 31 and the discharge pressure regulating valve 32 at one end, and is connected to a pipe between the expansion valve 13 and the evaporator 14 at the other end. The first defrost pipe 23 is provided with a third solenoid valve 43 that is opened at the time of the defrost operation. The second defrost pipe 24 is provided with a fourth solenoid valve 44 that is opened at the time of the defrost operation and a drain pan heater 37. The drain pan heater 37 is installed inside a drain pan provided within the container C in order to receive frost or dew condensation water detached from the surface of the evaporator 14. Therefore, when the refrigerant discharged by the compressor 11 flows through the drain pan heater 37 at the time of the defrost operation, a block of ice of the frost or dew condensation water collected by the drain pan absorbs heat from the refrigerant discharged by the compressor 11 and melts. Note that, at the time of the defrost operation, the discharge pressure regulating valve 32 is set to an all-closed state.

The pipe 27 is a pipe for a dehumidification operation for guiding the refrigerant discharged by the compressor 11 to the evaporator 14 side. The pipe 27 is connected to the pipe between the check valve 31 and the discharge pressure regulating valve 32 at one end, and connected to the pipe between the expansion valve 13 and the evaporator 14 at the other end. The pipe 27 is provided with a seventh solenoid valve 47 that is opened at the time of the dehumidification operation and a reheat coil 38. The reheat coil 38 is provided in the vicinity of the evaporator 14, such as in a lower portion of the evaporator 14. Therefore, at the time of the dehumidification operation, the refrigerant discharged by the compressor 11 flows through the reheat coil 38 and is sent to the evaporator 14 side.

The discharge gas bypass pipe 25 is connected to the second defrost pipe 24 between the check valve 31 and the fourth solenoid valve 44 at one end, and is connected to a pipe between the evaporator 14 and the intake proportional valve 35 at the other end. The discharge gas bypass pipe 25 is provided with a fifth solenoid valve 45. The fifth solenoid valve 45 is opened appropriately in accordance with the operating condition. The discharge gas bypass pipe 25 is a pipe for causing the refrigerant discharged by the compressor 11 to bypass the condenser 12 and the evaporator 14 to return to the intake side of the compressor 11, in the case where the cooling performance of the evaporator 14 is excessive or the like. Note that the discharge gas bypass pipe 25 also acts as an oil return pipe for bringing refrigerating machine oil within the refrigerant discharged from the compressor 11 back to the intake side of the compressor 11.

The liquid injection pipe 26 is a pipe for a so-called liquid injection for returning a liquid refrigerant condensed in the condenser 12 to the intake side of the compressor 11. The liquid injection pipe 26 is connected to a pipe between the first solenoid valve 41 and the economizer heat exchanger 34 at one end, and connected to a pipe between the intake proportional valve 35 and the compressor 11 at the other end. The liquid injection pipe 26 is provided with a sixth solenoid valve 46. The sixth solenoid valve 46 is opened appropriately in accordance with the operating condition.

As shown in FIG. 1, the refrigeration apparatus 1 is provided with an automatic ventilation opening 7 that can open or close. The automatic ventilation opening 7 is provided for the purpose of taking in exterior air and discharging interior air to ventilate the interior of the container.

The controller (one example of a control unit) 50 switches various operations (freezing operation, refrigerating operation, or defrost operation). The controller 50 includes a normal operation control unit 51, a power-saving operation control unit 52, and a dehumidification control unit 57 that perform control at the time of the refrigerating operation.

The normal operation control unit 51 performs control of the refrigerating operation in a normal operation mode in which the compressor 11 is operated continuously while adjusting the cooling performance of the evaporator 14. The normal operation control unit 51 stores a target temperature TS of interior air in an internal memory or the like.

The power-saving operation control unit 52 includes a first control unit 53, a second control unit 54, and a third control unit 55. The power-saving operation control unit 52 performs control of the refrigerating operation in a power-saving operation mode. The power-saving operation control unit 52 stores the target temperature TS of interior air. The power-saving operation control unit 52 stores an upper limit temperature and a lower limit temperature as a target range of interior temperature for use at the time of operation in the power-saving operation mode. Note that the details of the power-saving operation mode will be described later.

The dehumidification control unit 57 performs control of the refrigerating operation in a dehumidification operation mode in which an adjustment of decreasing the humidity of interior air is performed. The dehumidification control unit 57 stores a target humidity TH of interior air. The dehumidification control unit 57 stores, in an internal memory, the target humidity TH and a target range (for example, range of ±5% from the target humidity TH) including a region around the target humidity TH. The target humidity TH is the humidity of a high-humidity region, e.g., a humidity of 90%. A value of the target humidity TH falls within, for example, a humidity range (for example, region around 90% in humidity) in which dehumidification is possible with the control of the normal operation mode by the normal operation control unit 51.

The controller 50 includes an operation switch unit 56. The operation switch unit 56 switches the normal operation mode and the power-saving operation mode in the refrigerating operation upon a predetermined condition. The operation switch unit 56 is provided with an internal memory and a timer (one example of a measurement unit) 561. The internal memory stores the target humidity TH and the target temperature TS (as well as the target range based thereon). The timer 561 measures the elapsed time from a time point when the humidity detected by the humidity sensor HS has fallen to the target range, which includes the region around the target humidity TH, or less. Note that the timer 561 may be provided within the controller 50 separately from the operation switch unit 56.

The specific control operation of each unit of the controller 50 will be described later.

Note that the refrigeration apparatus 1 is provided with an operation unit 58 that accepts various operation indications (for example, an operation start indication, the value of the target humidity TH, or the like) relating to the operation from an operator. The operation unit (one example of a target humidity acceptance unit) 58 is connected to the controller 50.

[Driving Operation]

The refrigeration apparatus 1 is capable of switching between the freezing operation, the refrigerating operation (chilled operation), and the defrost operation described above. The freezing operation is an operation in which interior air is cooled to a temperature lower than 0 degrees Celsius to freeze a cargo in the interior. The refrigerating operation (chilled operation) is an operation in which interior air is cooled to a temperature higher than 0 degrees Celsius to refrigerate a cargo in the interior. Herein, the refrigerating operation relating to the present invention will be described.

In the refrigerating operation, operation in the normal operation mode (hereinafter, the refrigerating operation in the normal operation mode is the chilled operation), the power-saving operation mode, and the dehumidification operation mode is possible. The normal operation mode is an operation mode in which the compressor 11 and the interior fan 16 are operated continuously and interior air is continued to be cooled with the evaporator 14 to refrigerate a cargo in the interior. The power-saving operation mode is an operation mode in which the compressor 11 is operated intermittently and interior air is cooled semi-continuously with the evaporator 14 to refrigerate a cargo in the interior while achieving power saving. The dehumidification operation mode is an operation mode in which the humidity detected by the humidity sensor HS is adjusted to the target humidity TH.

[Normal Operation Mode]

Figure 4:
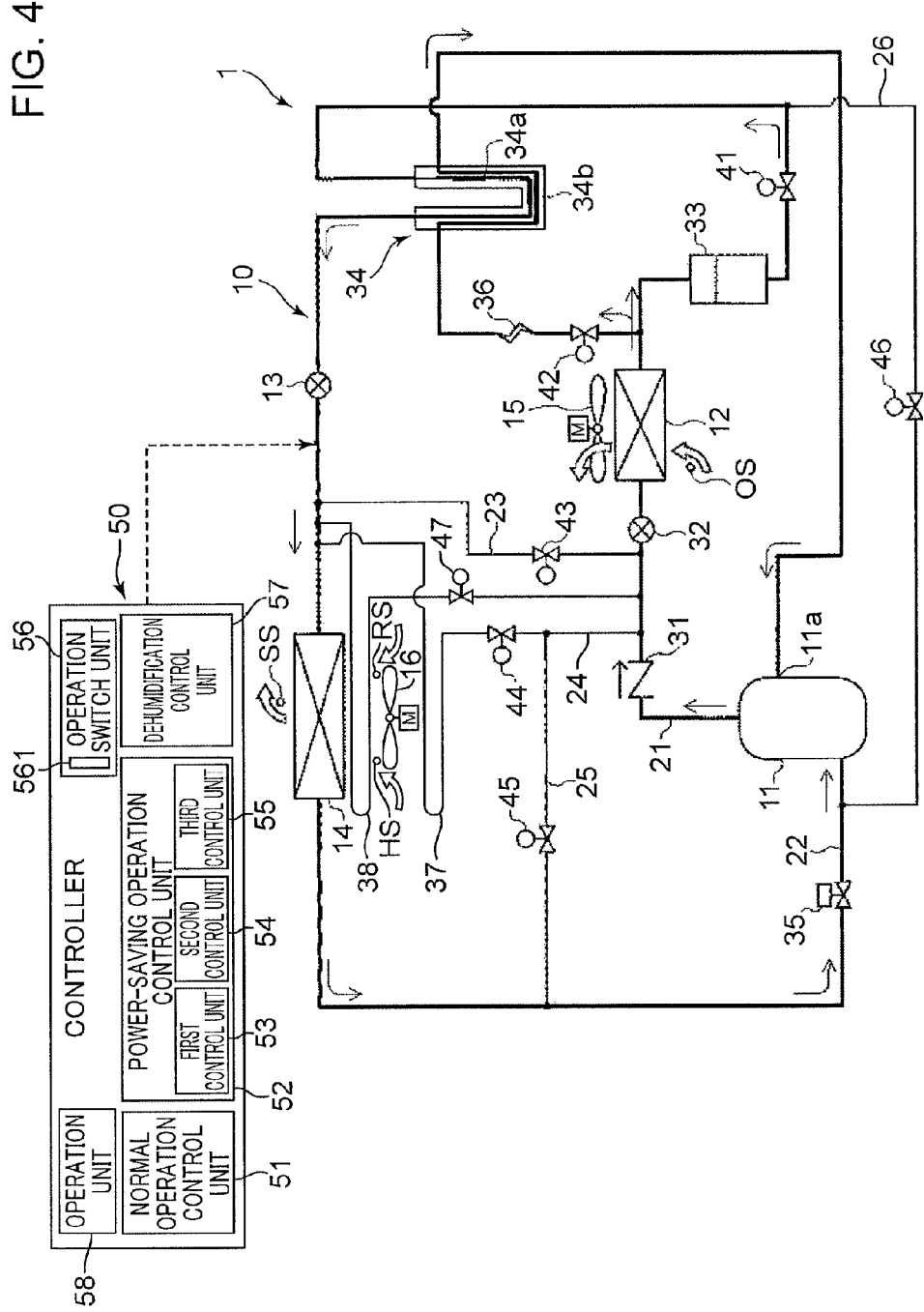
FIG. 4 is a schematic configuration diagram of the refrigerant circuit showing the flow of a refrigerant at the time of operation of the refrigeration apparatus.

First, the normal operation mode of the refrigeration apparatus 1 will be described with reference to FIG. 4. FIG. 4 is a schematic configuration diagram of the refrigerant circuit showing the flow of the refrigerant at the time of operation of the refrigeration apparatus 1. In the normal operation mode, normal operation control by the normal operation control unit 51 is performed. Specifically, with the normal operation control unit 51, the compressor 11 is operated continuously and the opening degree of the expansion valve 13 and the intake proportional valve 35 is adjusted appropriately in the normal operation mode. With the normal operation control unit 51, the third to sixth solenoid valves 43, 44, 45, and 46 are in principle closed simultaneously with the first and second solenoid valves 41 and 42 being opened and the exterior fan 15 and the interior fan 16 are operated at a normal rotation speed in the normal operation mode.

The refrigerant compressed in the compressor 11 flows into the condenser 12 via the discharge pipe 21. In the condenser 12, the refrigerant is condensed by releasing heat to exterior air. Then, a part of the refrigerant flows into the high-pressure side flow path 34a of the economizer heat exchanger 34 via the receiver 33. The remaining refrigerant flows into the low-pressure side flow path 34b of the economizer heat exchanger 34 after being decompressed upon passing through the caterpillar tube 36.

In the economizer heat exchanger 34, the refrigerant flowing in the low-pressure side flow path 34b evaporates by absorbing heat from the refrigerant flowing in the high-pressure side flow path 34a. That is, in the economizer heat exchanger 34, supercooling of the refrigerant flowing in the high-pressure side flow path 34a is performed. The refrigerant that has evaporated in the low-pressure side flow path 34b is drawn into the intermediate intake opening 11a of the compressor 11.

The refrigerant that has been supercooled in the high-pressure side flow path 34a flows into the evaporator 14 after being decompressed upon passing through the expansion valve 13. In the evaporator 14, the refrigerant evaporates by absorbing heat from interior air. As a result, cooling of the interior (cargo room) of the container C is performed. The refrigerant that has evaporated in the evaporator 14 is drawn into the compressor 11 after passing through the intake proportional valve 35.

[Power-Saving Operation Mode]

Figure 5:
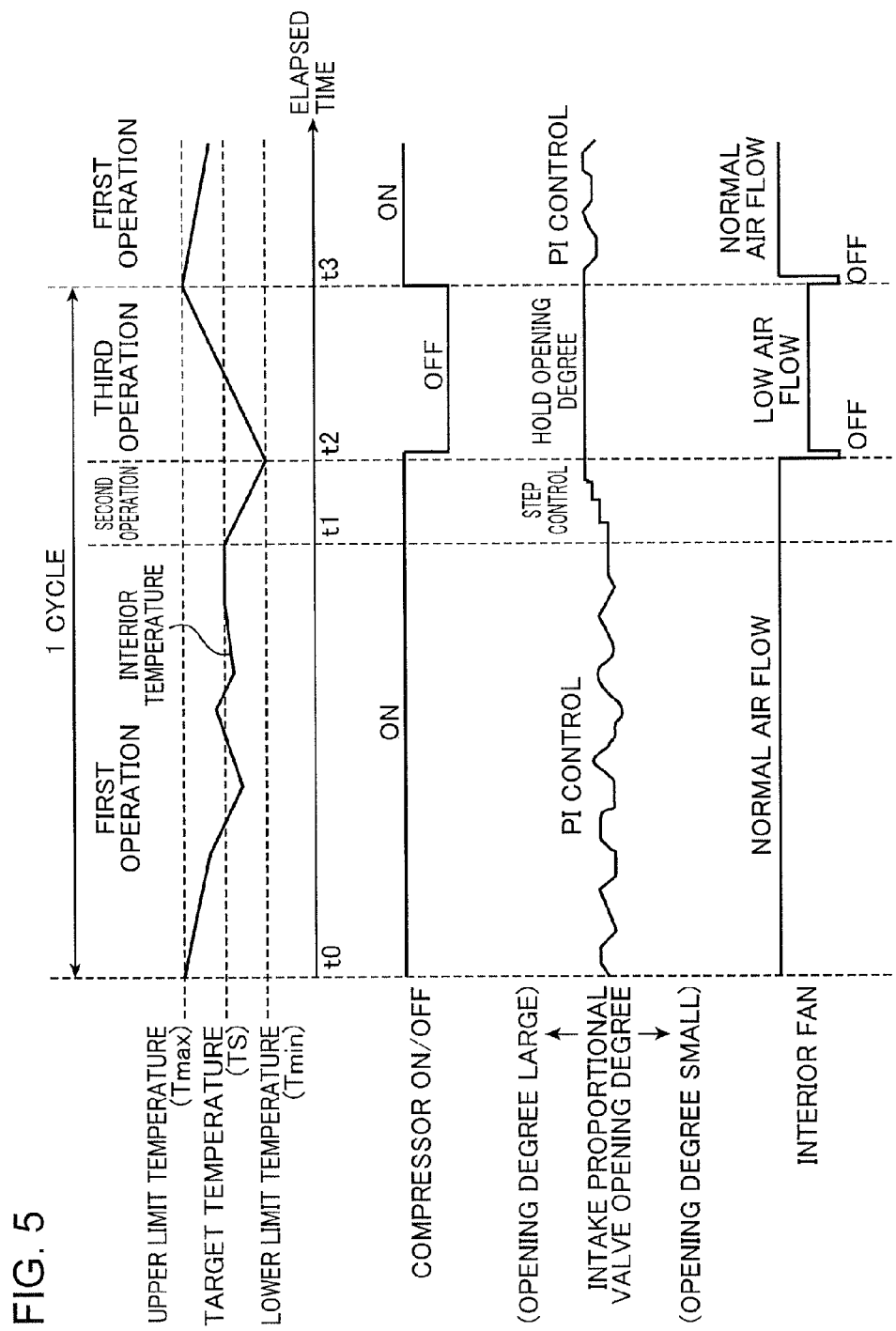
FIG. 5 is a timing diagram for illustrating the operation in a power-saving operation mode.

Next, the power-saving operation mode of the refrigeration apparatus 1 will be described. FIG. 5 is a timing diagram for illustrating the operation in the power-saving operation mode.

In the power-saving operation mode, power-saving control in a first operation to a third operation as shown in FIG. 5 is performed by the power-saving operation control unit 52. Note that the basic flow of the refrigerant of the refrigeration apparatus 1 at the time of the power-saving operation mode is similar to the flow of the refrigerant of the refrigeration apparatus 1 at the time of the normal operation mode described above.

In the first operation, the first control unit 53 drives the compressor 11 and drives the interior fan 16 in a normal rotation speed (first rotation speed). The first control unit 53 adjusts the cooling performance of the evaporator 14 such that the interior temperature becomes the target temperature TS during the first operation.

Specifically, during the first operation, the first control unit 53 adjusts the opening degree of the intake proportional valve 35 through PI control based on the target temperature TS and the detected temperature of the intake temperature sensor RS. As a result, the refrigerant circulation amount of the refrigerant circuit 10 is adjusted in accordance with the opening degree of the intake proportional valve 35 and the cooling performance of the evaporator 14 is also adjusted by the first control unit 53.

Note that, when the first control unit 53 adjusts the cooling performance of the evaporator 14 while narrowing the opening degree of the intake proportional valve 35 in this manner, the refrigerant is easily brought to a humid state in all regions of the evaporator 14. In the case where the first control unit 53 hypothetically adjusts the cooling performance of the evaporator 14 through opening degree adjustment of the expansion valve 13 on the inflow side of the evaporator 14, the refrigerant flowing in the evaporator 14 tends to dry and an unevenness in temperature easily occurs in the refrigerant between the inflow end and the outflow end of the evaporator 14. In contrast, the first control unit 53 adjusts the cooling performance of the evaporator 14 while narrowing the opening degree of the intake proportional valve 35, and therefore the temperature distribution of the refrigerant between the inflow end and the outflow end of the evaporator 14 is made uniform. Since interior air is cooled relatively uniformly as a result, the controllability of interior air by the evaporator 14 also improves.

After the first operation, the second operation is performed by the second control unit 54. Note that, in this embodiment, lapse of a set time that is predetermined in the first control unit 53 from a start time t0 of the first operation causes a shift from the first operation to the second operation. The set time is set to a time necessary for the interior temperature to be maintained at the target temperature TS by the cooling of the evaporator 14. In this embodiment, the set time is set to about 2 minutes. That is, in the power-saving operation mode, there is a shift from the first operation to the second operation when 2 minutes have elapsed from the time t0 and it is time t1 at which the interior temperature is determined to be reliably maintained at the target temperature TS.

In the second operation, the second control unit 54 gradually increases the cooling performance of the evaporator 14 from the time t1 and thereafter to decrease the interior temperature. Specifically, in the second operation, the second control unit 54 continues to drive the compressor 11 and drives the interior fan 16 in the normal rotation speed (first rotation speed). At the time t1 and thereafter, the second control unit 54 adjusts the opening degree of the intake proportional valve 35 to gradually increase. As a result, the refrigerant circulation amount of the refrigerant circuit 10 gradually increases, and the cooling performance of the evaporator 14 gradually increases.

When the interior temperature decreases due to such an opening degree adjustment of the intake proportional valve 35 and a lower limit temperature Tmin of the target range including the target temperature TS is reached, there is a shift from the second operation to the third operation. That is, the third operation is started by the third control unit 55 at time t2 at which the interior temperature has reached the lower limit temperature Tmin. Note that the opening degree adjustment of the intake proportional valve 35 by the second control unit 54 in at the time of the second operation is performed in stages such that the opening degree increases by 10% after each 10 seconds from the time t1. Since the interior temperature decreases relatively moderately as a result, occurrence of a so-called undershoot in which the interior temperature falls below the lower limit temperature Tmin after the shift from the second operation to the third operation is prevented.

In the third operation, the third control unit 55 promptly stops the compressor 11. As a result, the cooling cycle in the refrigerant circuit 10 stops, and the cooling of interior air by the evaporator 14 is substantially stopped. Therefore, the interior temperature gradually increases. During the third operation, the third control unit 55 applies a low rotation speed (second rotation speed) lower than the normal rotation speed to the interior fan 16. When the third control unit 55 causes the rotation speed of the interior fan 16 to be lower than during the first operation or during the second operation in this manner, the heating value involving operation of a motor of the interior fan 16 is reduced. Therefore, the speed of increase of the interior temperature at the time of the third operation is reduced. Note that, upon changing the rotation speed of the interior fan 16, the third control unit 55 operates the interior fan 16 in the low rotation speed (second rotation speed) promptly after a temporary stop in order to moderate a drastic torque fluctuation of the interior fan 16. During the third operation, the third control unit 55 holds the opening degree of the intake proportional valve 35 as is at an opening degree at the time of termination of the second operation (time t2).

When the interior temperature is gradually increased by the third operation in a manner described above and an upper limit temperature Tmax of the target range including the target temperature TS is reached, there is a shift from the third operation again to the first operation. That is, the first operation is started at time t3 at which the interior temperature has reached the upper limit temperature Tmax. As a result, the compressor 11 is again operated and the interior fan 16 is operated in the normal rotation speed (first rotation speed). For the intake proportional valve 35, the opening degree held at the time of the third operation is assumed as an initial opening degree at the time of the first operation. Then, the intake proportional valve 35 is adjusted in opening degree by the first control unit 53 through PI control based on the target temperature TS and the detected temperature of the intake temperature sensor RS. Therefore, the opening degree of the intake proportional valve 35 at the start of the first operation is the same opening degree as the opening degree at the time of termination of the second operation at which the cooling performance of the evaporator 14 has been increased to cool interior air. As a result, the refrigerant circulation amount is ensured from the start of the first operation at which the interior temperature reaches the upper limit temperature Tmax to reactivate the compressor 11, and interior air is promptly cooled such that the interior temperature again converges at the target temperature TS. In this manner, a change in the interior temperature within the target range based on the target temperature TS is tolerated in the power-saving control.

[Dehumidification Operation Mode]

Next, the dehumidification operation mode of the refrigeration apparatus 1 will be described. In the dehumidification operation mode, dehumidification control by the dehumidification control unit 57 is performed. Note that the basic flow of the refrigerant and control in the refrigeration apparatus 1 at the time of the dehumidification operation mode is similar to the flow of the refrigerant and control in the refrigeration apparatus 1 at the time of the normal operation mode described above.

In the dehumidification operation mode, the dehumidification control unit 57 gradually increases the cooling performance of the evaporator 14 to decrease the interior temperature. Specifically, the dehumidification control unit 57 drives the compressor 11 in a similar manner to the time of the normal operation mode and drives the interior fan 16 in the rotation speed of the time of the normal operation mode. However, the dehumidification control unit 57 causes the opening degree of the intake proportional valve 35 to be greater than in the normal operation mode. Accordingly, the refrigerant circulation amount of the refrigerant circuit 10 is increased.

Further, in order to cause the refrigerant discharged by the compressor 11 to flow through to the evaporator 14 side in a similar manner to the time of the defrost operation described above, the dehumidification control unit 57 opens the seventh solenoid valve 47 and causes the refrigerant discharged by the compressor 11 to flow through to the reheat coil 38 incorporated in the evaporator 14. Accordingly, a lot of dew condensation is generated in the evaporator 14 when air is sent toward the evaporator 14 from the interior fan 16. In this manner, dehumidification of interior air is performed. Dew condensation water is collected in the drain pan.

The dehumidification control unit 57 performs the dehumidification control such that the humidity detected by the humidity sensor HS approaches the target range (for example, ±5% from the target humidity TH) described above including the region around the target humidity TH.

[Switching Control of Normal Operation Mode, Dehumidification Operation Mode, and Power-Saving Operation Mode]

Figure 6:
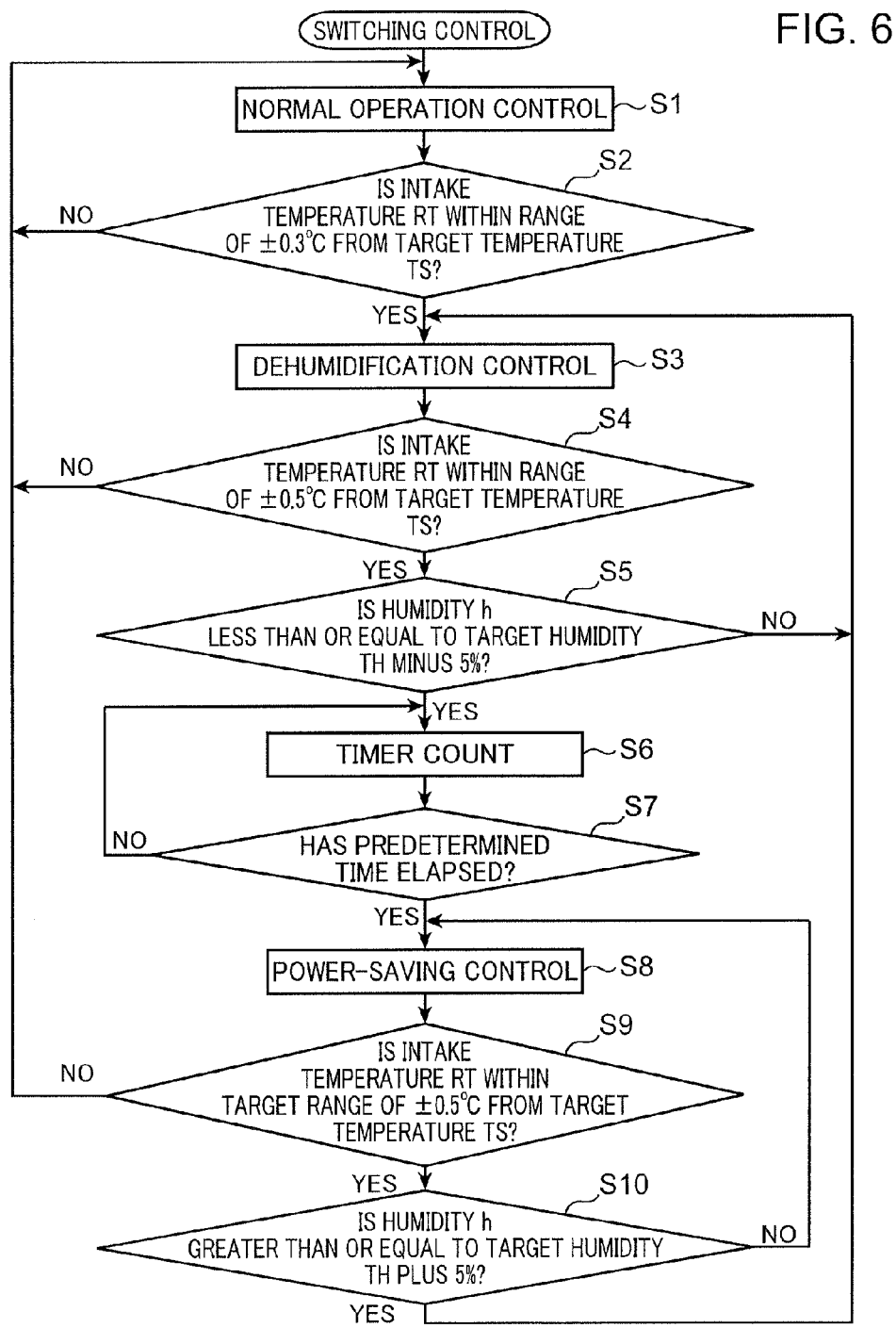
FIG. 6 is a flowchart showing the operation of switching control of a normal operation mode, a dehumidification operation mode, and the power-saving operation mode in the refrigeration apparatus.
Figure 7:
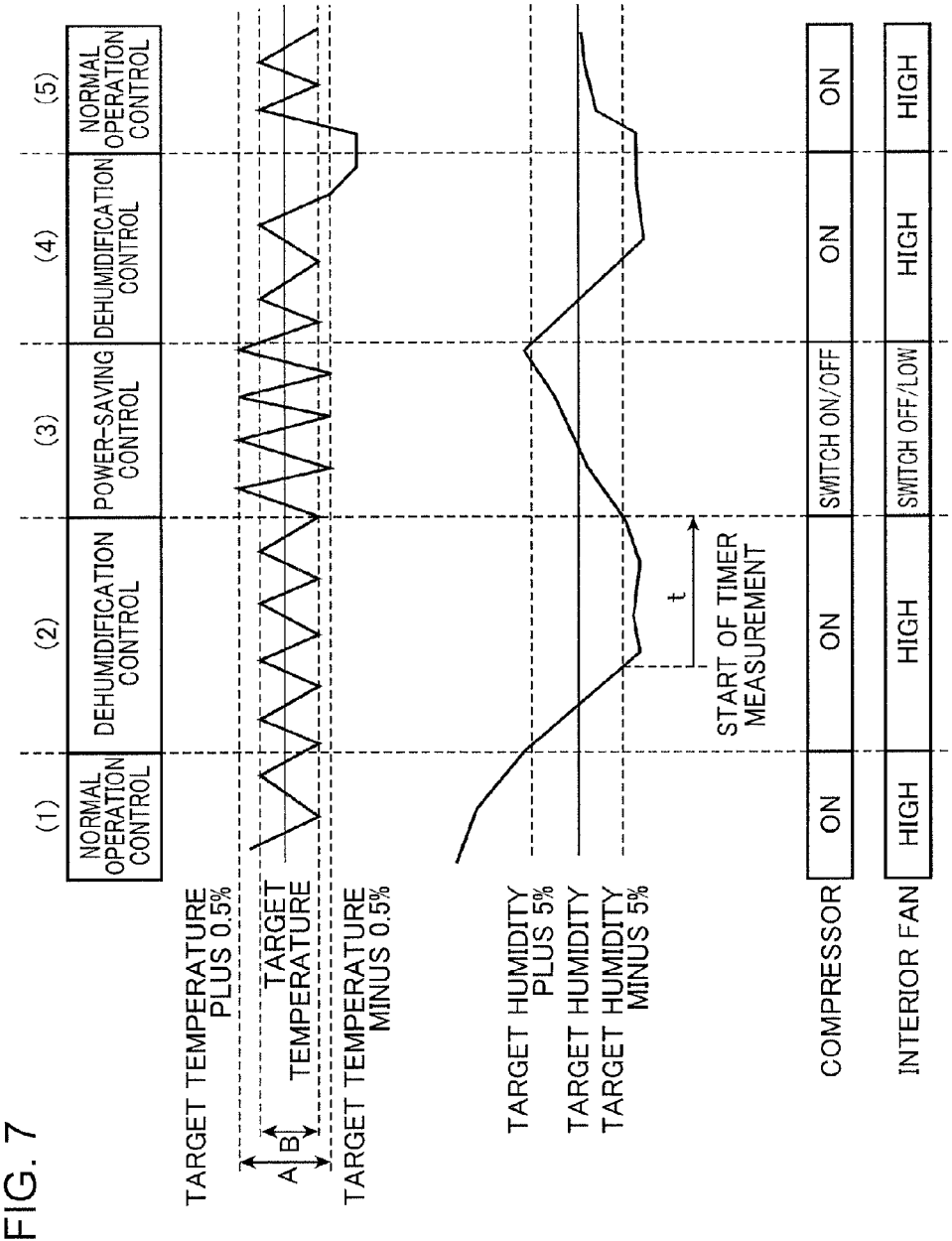
FIG. 7 is a timing diagram for illustrating the operation in the dehumidification operation mode.

In the refrigeration apparatus 1, the normal operation mode, the dehumidification operation mode, and the power-saving operation mode described above are switched in a manner below. FIG. 6 is a flowchart showing the operation of the switching control of the normal operation mode, the dehumidification operation mode, and the power-saving operation mode in the refrigeration apparatus 1. FIG. 7 is a timing diagram for illustrating the operation in the dehumidification operation mode.

First, when the refrigeration apparatus 1 is brought to the normal operation mode in which the normal operation control is performed by the normal operation control unit 51 (S1), the operation switch unit 56 compares an intake temperature RT detected in the intake temperature sensor RS and a temperature range (region B shown in FIG. 7) of ±0.3° C. from the target temperature TS of interior air (S2). Herein, in the case where the intake temperature RT is outside the temperature range of ±0.3° C. from the target temperature TS (NO in S2), it is necessary to promptly bring the interior temperature closer to within the temperature range of ±0.3° C. from the target temperature TS. Therefore, the operation switch unit 56 does not switch the operation mode, and the normal operation control unit 51 continues the normal operation control.

In the case where the intake temperature RT is within the temperature range of ±0.3° C. from the target temperature TS due to the normal operation control by the first control unit 53 (YES in S2), the interior temperature is already maintained within the temperature range of ±0.3° C. from the target temperature TS that is the region around the target temperature TS. Therefore, the operation switch unit 56 switches the operation mode to the dehumidification operation mode (change from (1) to (2) shown in FIG. 7), and the dehumidification control unit 57 starts the dehumidification control (S3).

In the dehumidification operation mode, the dehumidification control unit 57 performs the dehumidification operation with the dehumidification control described above, and the operation switch unit 56 compares the intake temperature RT detected in the intake temperature sensor RS and a temperature range (region A shown in FIG. 7) of ±0.5° C. from the target temperature TS of interior air (S4). Herein, in the case where the intake temperature RT is outside the temperature range (region A shown in FIG. 7) of ±0.5° C. from the target temperature TS (NO in S4), the operation switch unit 56 switches the operation mode to the normal operation mode (change from (4) to (5) shown in FIG. 7) in order to promptly bring the interior temperature back to within the temperature range (region B) of ±0.3° C. from the target temperature TS.

In the case where the intake temperature RT is maintained within the temperature range of ±0.5° C. from the target temperature TS (YES in S4), the operation switch unit 56 determines whether or not a humidity h detected in the humidity sensor HS is a humidity that is 5% lower than the target humidity TH (target humidity TH minus 5%) or less (S5). The target humidity TH is, as described above, the humidity of the high-humidity region, e.g., humidity of 90%, and is stored in the internal memory or the like of the operation switch unit 56. For the value of the target humidity TH, as described above, a value of the humidity range (for example, region around 90% in humidity) in which dehumidification is possible with the normal operation control by the normal operation control unit 51 is used.

In the case where the humidity h detected in the humidity sensor HS has not become the target humidity TH minus 5% or less (NO in S5), the operation switch unit 56 maintains the operation mode as is in the dehumidification operation mode (S3).

In the case where the humidity h detected in the humidity sensor HS has become the target humidity TH minus 5% or less (YES in S5), measurement of the elapsed time from a time point at which the humidity h has become the target humidity TH minus 5% or less is started by the timer 561 (S6).

When the timer 561 continues the measurement (S6 and NO in S7) and the elapsed time from the time point at which the humidity h has become the target humidity TH minus 5% or less reaches a predetermined time t (for example, 10 minutes) (YES in S7), the operation switch unit 56 switches the operation mode to the power-saving operation mode (change from (2) to (3) shown in FIG. 7), and the power-saving operation control unit 52 starts the power-saving control (S8).

In the power-saving operation mode, the power-saving operation control unit 52 performs the power-saving control described above, and the operation switch unit 56 compares the intake temperature RT detected in the intake temperature sensor RS and the temperature range (region A shown in FIG. 7) of ±0.5° C. from the target temperature TS of interior air (S9). In the case where the intake temperature RT is outside the temperature range of ±0.5° C. from the target temperature TS (NO in S9), the operation switch unit 56 switches the operation mode to the normal operation mode and the normal operation control unit 51 performs a normal operation control (S1), in order to promptly bring interior air within the target range.

In the case where the intake temperature RT is maintained within the temperature range of ±0.5° C. from the target temperature TS (YES in S9), the operation switch unit 56 determines whether or not the humidity h detected in the humidity sensor HS is the target humidity TH plus 5% or greater (S10). In the case where the humidity h detected in the humidity sensor HS has not become the target humidity TH plus 5% or greater (NO in S10), the operation switch unit 56 maintains the operation mode as is in the power-saving operation mode, and the power-saving operation control unit 52 continues the power-saving control (S8). In this manner, with the power-saving control, a change in the intake temperature RT within the temperature range (±0.5° C. from the target temperature TS) based on the target temperature TS is tolerated. In the case where the humidity h detected in the humidity sensor HS has become the target humidity TH plus 5% or greater (YES in S10), the operation switch unit 56 switches the operation mode to the dehumidification operation mode (change from (3) to (4) shown in FIG. 7), and the dehumidification control unit 57 starts the dehumidification control (S3).

Note that, in the refrigeration apparatus 1, the defrost operation described above is performed regularly (for example, every 4 hours) regardless of the respective operation modes. After termination of the defrost operation, the normal operation control by the normal operation control unit 51 is performed, and the switching control of the operation modes in step S1 and thereafter is performed by the operation switch unit 56 as described above.

Effect of Embodiment

With the embodiment, an effect below is obtained.

A conventional refrigeration apparatus has been capable only of performing switching of normal operation control and power-saving control or performing switching of normal operation control and dehumidification control, in order to ensure the operation performance for both dehumidification and cooling. In contrast, in the refrigeration apparatus 1 in this embodiment, the controller 50 performs switching from the dehumidification control to the power-saving control under the condition that humidity h of interior air at the time of the dehumidification control falls to the target range including the target humidity TH of the high-humidity region or less. Accordingly, the dehumidification performance is ensured even in cooling with the power-saving control, and ensuring of the necessary cooling performance can be achieved.

That is, with the refrigeration apparatus 1 of this embodiment, the refrigeration apparatus that cools interior air with the cooling heat exchanger can be operated at greater power efficiency than conventionally achieved while ensuring the operation performance for both dehumidification and cooling.

Note that the present invention is not limited to the embodiment, and may be applied in various modified embodiments. For example, in the embodiment, the operation switch unit 56 switches from the dehumidification operation mode to the power-saving operation mode when the elapsed time measured by the timer 561 has reached the predetermined time t. However, instead, the operation switch unit 56 may switch from the dehumidification operation mode to the power-saving operation mode without waiting for the predetermined time t to elapse, in the case where, for example, the humidity h detected by the humidity sensor HS has become a humidity (for example, humidity 7% lower than the target humidity TH (target humidity TH minus 7%)) further lower than the humidity 5% lower than the target humidity TH (target humidity TH minus 5%) that is the lower limit value of the target range including the target humidity TH described above.

In the embodiment, the operation switch unit 56 switches from the dehumidification operation mode to the power-saving operation mode in the case where the predetermined condition described above is satisfied. However, it may be such that the operation switch unit 56 does not perform switching from the dehumidification operation mode to the power-saving operation mode, in the case where the target humidity TH set through operation of the operation unit 58 by the operator is lower than a humidity (for example, 90%) in which dehumidification is impossible with an operation in the normal operation mode. In this case, the operation switch unit 56 temporarily brings the operation mode back to the normal operation mode when the humidity h detected by the humidity sensor HS is kept within the target range described above including the region around the target humidity TH by the dehumidification operation. When the intake temperature RT is within the range of ±0.3° C. from the target temperature TS and interior temperature has fallen within the target range in the normal operation mode, the operation switch unit 56 switches from the normal operation mode to the power-saving operation mode. The operation switch unit 56 temporarily brings the operation mode back to the normal operation mode when the humidity h detected by the humidity sensor HS falls outside the target range described above including the region around the target humidity TH in the power-saving operation mode. When the humidity h detected by the humidity sensor HS falls outside the target range described above including the region around the target humidity TH in the normal operation mode, the operation switch unit 56 switches from the normal operation mode to the dehumidification operation mode.

Note that the specific embodiment described above mainly includes the invention having the configuration below.

In the refrigeration apparatus of the embodiment, the target range of the high-humidity region is set to include the target humidity of the high-humidity region that is predetermined. The target humidity of the high-humidity region is a value within the humidity range in which dehumidification is possible with the normal operation control.

With this aspect, the target humidity of the high-humidity region is a value within the humidity range in which dehumidification is possible with the normal operation control. Therefore, it is possible to ensure both dehumidification and cooling according to necessity, even if switching is directly from the dehumidification control to the power-saving control that is control in which a change in the interior temperature within the temperature range based on the target temperature used in the normal operation control is tolerated.

The refrigeration apparatus preferably further includes the target humidity acceptance unit (58) that accepts a setting of the target humidity of the high-humidity region. In accordance therewith, the control unit (50) preferably performs switching from the dehumidification control to the power-saving control using the target range of the high-humidity region that is set to include the target humidity of the high-humidity region accepted by the target humidity acceptance unit (58).

With this aspect, the control unit (50) performs switching from the dehumidification control to the power-saving control using the target range of the high-humidity region that is set to include the target humidity of the high-humidity region accepted by the target humidity acceptance unit (58). Therefore, the control unit (50) can be caused to perform switching from the dehumidification control to the power-saving control based on the target humidity of the high-humidity region desired by a user or operator.

The refrigeration apparatus preferably further includes the measurement unit (561) that measures the elapsed time from a time point at which the humidity detected by the humidity detection unit (HS) has become the lower limit value of the target range of the high-humidity region or less. In accordance therewith, the control unit (50) preferably performs switching from the dehumidification control to the power-saving control in the case where the elapsed time measured by the measurement unit (561) has reached a certain time that is predetermined.

With this aspect, the control unit (50) performs switching from the dehumidification control to the power-saving control in the case where the elapsed time measured by the measurement unit (561) has reached the certain time. Therefore, switching to the power-saving control is performed after the humidity has been decreased sufficiently by the dehumidification control. Thus, cooling is possible with necessary dehumidification being secured reliably.

In the power-saving control by the control unit (50), the refrigeration apparatus preferably performs the first operation in which the compressor (11) is operated while adjusting the cooling performance of the cooling heat exchanger (14), the second operation in which the cooling performance of the cooling heat exchanger (14) is increased when the interior temperature reaches the target temperature during the first operation and the compressor (11) is stopped when the interior temperature is reduced to the lower limit value of the target range including the target temperature, and the third operation in which the compressor (11) is activated when the interior temperature reaches the upper limit value of the target range after stoppage of the compressor (11) by the second operation.

With this aspect, the compressor (11) is operated intermittently at the time of the power-saving control. Therefore, the driving power for the compressor (11) can be reduced to improve the power efficiency of the refrigeration apparatus.

EXPLANATION OF REFERENCE NUMERALS

1 Refrigeration apparatus
10 Refrigerant circuit
11 Compressor
14 Evaporator (cooling heat exchanger)
16 Interior fan (fan mechanism)
50 Controller (control unit)
51 Normal operation control unit
52 Power-saving operation control unit
56 Operation switch unit
57 Dehumidification control unit
58 Operation unit (target humidity acceptance unit)
561 Timer (measurement unit)
HS Humidity sensor (humidity detection unit)

The invention claimed is:
1. A refrigeration apparatus comprising:
a cooling heat exchanger for cooling an interior;
a fan mechanism that generates a flow of air for cooling the cooling heat exchanger;
a compressor that compresses a refrigerant;
a refrigerant circuit to which the cooling heat exchanger and the compressor are connected and which is for performing a refrigeration cycle with the refrigerant that is circulated;
a humidity detection unit that detects a humidity of interior air;

a temperature detection unit that detects a temperature of interior air; and a control unit that performs normal operation control for controlling drive of the fan mechanism and the compressor in order to bring an interior temperature detected by the temperature detection unit to a target temperature-dehumidification control for adjusting a humidity detected by the humidity detection unit to a predetermined target range of a high-humidity region, and a power-saving control which is implemented by the control of drive of the fan mechanism and the compressor such that a change in the interior temperature within a temperature range is tolerated, the temperature range being based on the target temperature, wherein the target range of the high-humidity region includes a target humidity of an interior air, an upper limit value that is higher than the target humidity, and a lower limit value that is lower than the target humidity, the control unit does not switch from the dehumidification control to the power-saving control in a time point at which a humidity detected by the humidity detection unit has become the lower limit value of the target range of the high-humidity region or less at a time of the dehumidification control, the control unit performs switching from the dehumidification control to the power-saving control in a case where a predetermined time is passed from the time point.

2. The refrigeration apparatus according to claim 1, wherein the target range of the high-humidity region is set to include a humidity of 90%.

3. The refrigeration apparatus according to claim 1, further comprising a target humidity acceptance unit that accepts a setting of the target humidity of the high-humidity region, wherein the control unit performs switching from the dehumidification control to the power-saving control using the target range of the high-humidity region that is set in such a way as to include the target humidity of the high-humidity region accepted by the target humidity acceptance unit.

4. The refrigeration apparatus according to claim 1, wherein the power-saving control by the control unit includes a first operation in which the compressor is driven while adjusting a cooling performance of the cooling heat exchanger, a second operation in which a cooling performance of the cooling heat exchanger is enhanced when the interior temperature reaches the target temperature during the first operation and the compressor is stopped when the interior temperature is reduced to a lower limit value of a target range including the target temperature, and a third operation in which the compressor is activated when the interior temperature reaches an upper limit value of the target range after stoppage of the compressor by the second operation.

* * * * *